US009158675B2

(12) United States Patent
Au et al.

(10) Patent No.: US 9,158,675 B2
(45) Date of Patent: Oct. 13, 2015

(54) ARCHITECTURE FOR STORAGE OF DATA ON NAND FLASH MEMORY

(71) Applicant: Marvell World Trade Ltd., St. Michael (BB)

(72) Inventors: Siu-Hung Frederick Au, Fremont, CA (US); Fei Sun, Santa Clara, CA (US); Hyunsuk Shin, San Diego, CA (US); Chi Kong Lee, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 160 days.

(21) Appl. No.: 13/804,113

(22) Filed: Mar. 14, 2013

(65) Prior Publication Data

US 2013/0246892 A1    Sep. 19, 2013

Related U.S. Application Data

(60) Provisional application No. 61/612,140, filed on Mar. 16, 2012.

(51) Int. Cl.
*G11C 29/00* (2006.01)
*G06F 12/02* (2006.01)
(Continued)

(52) U.S. Cl.
CPC ........ *G06F 12/0246* (2013.01); *G06F 11/1008* (2013.01); *G06F 11/1068* (2013.01); *G06F 3/064* (2013.01); *G06F 3/0608* (2013.01); *G06F 3/0679* (2013.01); *G06F 11/108* (2013.01); *G06F 2212/7202* (2013.01); *G06F 2212/7208* (2013.01); *Y02B 60/1225* (2013.01)

(58) Field of Classification Search
CPC ............ G06F 11/1068; G06F 11/1008; G06F 12/0246; G06F 3/0608; G06F 2212/7208; G06F 11/108; G06F 3/0679; G06F 2212/7202; G06F 3/064
USPC .......................... 714/E11.034, 773; 711/114
See application file for complete search history.

(56) References Cited

U.S. PATENT DOCUMENTS

| 8,639,969 B2 | 1/2014 | Kawaguchi |
| 2003/0188097 A1* | 10/2003 | Holland et al. ............... 711/114 |
| 2004/0205387 A1* | 10/2004 | Kleiman et al. .................. 714/6 |

(Continued)

FOREIGN PATENT DOCUMENTS

| WO | WO 2010/054410 | 5/2010 |
| WO | WO 2010/078167 | 7/2010 |

OTHER PUBLICATIONS

International Search Report dated Jul. 18, 2013 for Application No. PCT/US2013/031182.

(Continued)

*Primary Examiner* — Guy Lamarre

(57) ABSTRACT

Systems, methods, apparatus, and techniques are provided for processing data from a storage medium. A stripe of data stored on the storage medium is read, where the stripe comprises a plurality of data allocation units (AUs) and a parity AU. Error correction decoding is applied to each of the plurality of data AUs to produce a plurality of decoded data AUs. It is determined whether a value of the parity AU is satisfied by values of bytes in the plurality of decoded data AUs. The plurality of decoded data AUs are output in response to a determination that the value of the parity AU is satisfied by the values of bytes in the plurality of decoded data AUs.

20 Claims, 6 Drawing Sheets

(51) Int. Cl.
*G06F 11/10* (2006.01)
*G06F 3/06* (2006.01)

(56) References Cited

U.S. PATENT DOCUMENTS

2006/0080505 A1 4/2006 Arai et al.
2008/0162811 A1 7/2008 Steinmetz et al.
2008/0195810 A1 8/2008 Wu et al.
2011/0258380 A1 10/2011 Goss et al.
2013/0246890 A1 9/2013 Au et al.
2013/0254627 A1 9/2013 Jeddeloh
2014/0143634 A1 5/2014 Post

OTHER PUBLICATIONS

International Search Report and Written Opinion dated Jul. 23, 2013 in International Application No. PCT/US2013/031114.

* cited by examiner

| | CH 0 | | CH 1 | | CH 2 | | CH 3 | |
|---|---|---|---|---|---|---|---|---|
| | Plane 0 | Plane 1 | Plane 0 | Plane 1 | Plane 0 | Plane 1 | Plane 0 | Plane 1 |
| Page 0 | 1,2 | 17,18 | 3,4 | 19,20 | 5,6 | 21,22 | 7,8 | 23,24 |
| Page 1 | 9,10 | 25,26 | 11,12 | 27,28 | 13,14 | 29,30 | 15,16 | 31,32 |

○ - parity AU

| | CH 0 | | CH 1 | | CH 2 | | CH 3 | |
|---|---|---|---|---|---|---|---|---|
| | Plane 0 | Plane 1 | Plane 0 | Plane 1 | Plane 0 | Plane 1 | Plane 0 | Plane 1 |
| Page 0 | 1,2 | 15,16 | 2,3,4 | 16,17,18 | 4,5,6 | 18,19,⟨20⟩ | 6,7 | ⟨20⟩,21 |
| Page 1 | 8,9 | 22,23 | 9,10,11 | 23,24,25 | 11,12,13 | 25,26,⟨27⟩ | 13,14 | ⟨27⟩,28 |

310, 312, 314, 316, 318, 320, 322, 324, 330, 332

○ - parity AU

| Stripe 1 | 1, 17, 5, 21, 9, 25, 13, ㉙ |
| --- | --- |
| Stripe 2 | 2, 18, 6, 22, 10, 26, 14, ㉚ |
| Stripe 3 | 3, 19, 7, 23, 11, 27, 15, ㉛ |
| Stripe 4 | 16, 4, 20, 8, 24, 12, ㉘, 16 |

610

CH 0
| | Plane 0 | Plane 1 |
| --- | --- | --- |
| Page 0 | 1,2 | 16,17,18 |
| Page 1 | 2,3,4 | 18,19,20 |

CH 1
| Plane 0 | Plane 1 |
| --- | --- |
| 4,5,6 | 20,21,22 |
| 6,7,8 | 22,23,24 |

CH 2
| Plane 0 | Plane 1 |
| --- | --- |
| 8,9,10 | 24,25,26 |
| 10,11,12 | 26,27,㉘ |

CH 3
| Plane 0 | Plane 1 |
| --- | --- |
| 12,13,14 | ㉘㉙㉚ |
| 14,15,16 | ㉚㉛ |

ARCHITECTURE FOR STORAGE OF DATA ON NAND FLASH MEMORY

CROSS-REFERENCE TO RELATED APPLICATIONS

This patent document claims the benefit of, and priority to, U.S. Provisional Application No. 61/612,140, filed Mar. 16, 2012, the disclosure of which is hereby incorporated by reference herein in its entirety.

FIELD OF USE

This disclosure relates to techniques for efficiently writing data to a storage medium including a redundant array of independent disks (RAID) NAND flash storage medium.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

A solid state drive (SSD) reads and writes data from devices such as NAND flash memory devices or dynamic random access memory (DRAM) devices that may be implemented using a RAID architecture. The SSD typically includes an SSD controller with a number of data channels for transferring data to and from the NAND flash memory. Further, the SSD controller typically executes firmware that manages data in fixed byte size units known as allocation units (AUs). Traditionally, data is written to a given page of the NAND flash memory in a single operation and the write operation includes a number of bytes that is an integer multiple of the size of an AU. Thus, when a page size of the NAND flash is not an integer multiple of the AU size, the memory of the NAND flash may be underutilized.

SUMMARY OF THE DISCLOSURE

Systems, methods, apparatus, and techniques are provided for processing data from a storage medium. A stripe of data stored on the storage medium is read, where the stripe comprises a plurality of data allocation units (AUs) and a parity AU. Error correction decoding is applied to each of the plurality of data AUs to produce a plurality of decoded data AUs. It is determined whether a value of the parity AU is satisfied by values of bytes in the plurality of decoded data AUs. The plurality of decoded data AUs are output in response to a determination that the value of the parity AU is satisfied by the values of bytes in the plurality of decoded data AUs.

In some implementations, it is determined whether a data AU in the plurality of data AUs is unreadable. In some implementations, a first portion of the stripe of data is read using a first data transfer channel in the plurality of data transfer channels and a second portion of the stripe of data is read using a second transfer channel in the plurality of data transfer channels. In some implementations, a data AU in the plurality of data AUs is partially stored in each of a first page and a second page of the storage medium. In some implementations, the data AU in the plurality of data AUs is partially stored in each of a first data transfer channel and a second data transfer channel of the storage medium. In some implementations, a value of a byte of the parity AU in a given byte position is generated by exclusive ORing a value of a byte in the given byte position in every data AU in the plurality of data AUs.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which:

FIG. 2 depicts an illustrative technique for writing a sequence of AUs to NAND pages of a RAID-implemented storage medium in accordance with some embodiments;

FIG. 3 depicts an illustrative stripe-based technique for writing a sequence of AUs to NAND pages of a RAID-implemented storage medium in accordance with some embodiments;

FIG. 6 depicts an additional illustrative stripe-based technique for writing a sequence of AUs to NAND pages of a RAID-implemented storage medium in accordance with some embodiments.

DETAILED DESCRIPTION OF THE DISCLOSURE

Disclosed herein are techniques for increasing utilization of a storage medium, including RAID-based NAND flash storage medium, based on a stripe-based logical structure. As disclosed herein, a stripe is defined to be a collection of AUs stored on the storage medium. The stripe-based approach allows AUs to be written across page boundaries thus increasing utilization of the storage medium. Further, as disclosed herein, the stripe-based logic architecture is advantageous in a RAID-based implementation as a failure occurring to one disk (or device) of the RAID will generally not render unrecoverable related data stored on other disks (or devices) of the RAID.

Figure 1:
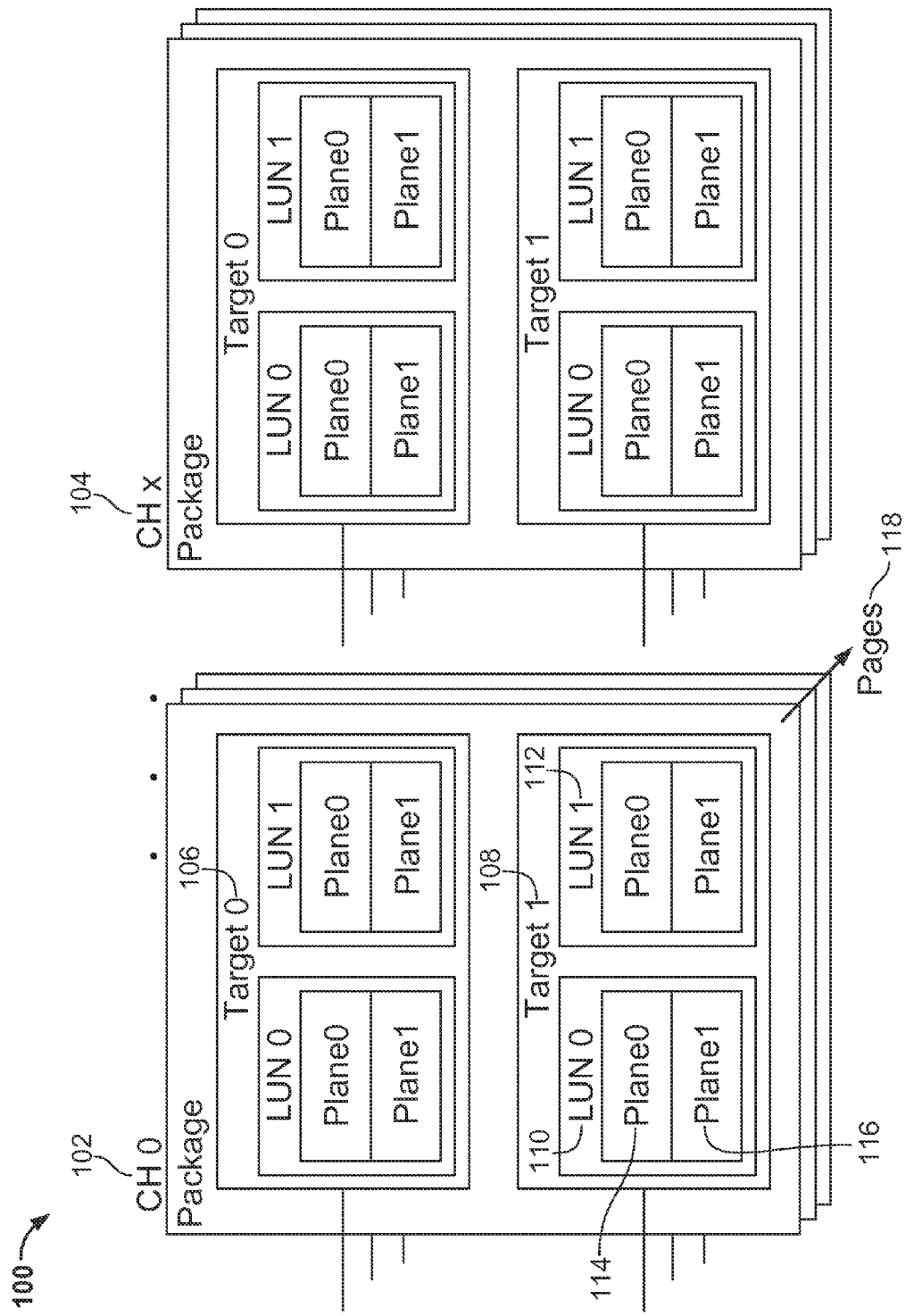
FIG. 1 depicts an illustrative array of NAND pages of a RAID-implemented storage medium in accordance with some embodiments.

FIG. 1 depicts an illustrative array of NAND pages of a RAID-implemented storage medium in accordance with some embodiments. Firmware of an SSD controller may access memory locations of the RAID-implemented storage medium based on a parameterization of the memory locations according to channels, pages, logical unit numbers (LUNs), and physical devices (e.g., pieces of silicon). In particular, illustration 100 shows that the array of NAND pages is addressable using x+1 data transfer channels, which are labeled CH0 102 through CHx 104, respectively. The illustration 100 depicts the structure of the data transfer channels CH0 102 and CHx 104 in particular detail.

Each of the data transfer channels depicted in the illustration 100 may be used to access multiple physical devices (or "targets"), e.g., hard disk drives. For example, the data transfer channel CH0 102 may be used to interface with the target 0 106 and the target 1 108. Further, each of the targets of the illustration 100 includes multiple LUNs. For example, the target 1 108 includes LUN 0 110 and LUN 1 112. Each LUN may correspond to, e.g., a virtual hard disk drive partition. Each LUN may include multiple planes, where each plane is powered by a different set of power resources. For example, the LUN 0 110 includes plane 0 114 and plane 1 116. Finally, the array of NAND pages may include any number of pages 118.

As would be understood by one of ordinary skill, based on the disclosure and teachings herein, the array of NAND pages of a RAID-implemented storage medium depicted in FIG. 1 is merely illustrative and the techniques disclosed herein may be applied to any suitable NAND array. For example, the techniques disclosed herein may be applied to a NAND array including more than two targets per page and data transfer channel and/or to LUNs that include more than two planes.

FIG. 2 depicts an illustrative technique for writing a sequence of AUs to NAND pages of a RAID-implemented storage medium in accordance with some embodiments. In particular, illustration 200 depicts how 32 consecutives AUs are written to pages spanning various channels and planes of the storage medium. As depicted in the illustration 200, firmware of the SSD controller is programmed to write the first and second AUs in the sequence of 32 AUs to channel 0, plane 0, and page 0 of the RAID-implemented storage medium. Similarly, the firmware of the SSD controller is programmed to write the seventeenth and eighteenth AUs in the sequence of 32 AUs to channel 0, plane 1, and page 0 of the RAID-implemented storage medium. Similarly, the exact location (in terms of a channel, plane, and page no.) for each of the remaining AUs in the sequence of 32 AUs is represented by the corresponding numerical value displayed in one of the boxes of FIG. 2.

Each AU depicted in FIG. 2 is individually coded with an error correction code (ECC), i.e., and a portion of bytes of the AU are ECC encoding bytes. Nevertheless, a typical ECC code may only fully correct a codeword in which a small minority of bytes are corrupted and will not be able to fully correct a codeword in which a large percentage of the codeword's bytes are corrupted or otherwise lost. Accordingly, the SSD controller used to generate the write pattern depicted in FIG. 2 requires that a given AU be written entirely to a single page of a storage device. This requirement is reflected in FIG. 2, which shows that each AU is contained entirely within a single page (i.e., a single rectangular box).

One reason that a system may require that each AU be contained entirely within a single page is to prevent "cascading errors." In particular, consider a system in which a single page contains only a portion of one or more AUs (each of these AUs therefore has its remaining contents spread across multiple other pages). If the single page is corrupted or lost, then it is not just the bytes of the single page that are lost, but all the bytes of all the AUs even partially contained on the single page. Thus, a single page failure may result in a large loss of data effecting bytes spread across multiple pages.

However, while requiring that each AU be contained entirely within a single page is advantageous for preventing cascading errors, it potentially results in an under-utilization of the storage medium. For example, suppose that each page of the NAND pages of the RAID-implemented storage medium associated with FIG. 2 has a size of 2,048 bytes and that each AU has a size of 748 bytes. If a given AU may not cross pages of the storage device and must instead be written entirely to a single page, then at most two AUs may be written to each page. This is because two AUs represent 748×2=1,496 bytes, which is less than the page size, while three AUs represent 748×3=2,244 bytes, which is larger than the page size. Accordingly, as depicted in FIG. 2, each of the 16 pages stores exactly two AUs of data. In particular, each page uses only 1,496 bytes out of a total of 2,048 bytes, and each page is therefore underutilized by approximately 27-percent.

In applications in which a page size of a storage medium is not an integer multiple of an AU size, no multiple number of AUs will exactly occupy all the bytes of a page of the storage medium and the storage medium will thus be underutilized based on the techniques described in relation to FIG. 2. Accordingly, a stripe-based technique, as described in the disclosure herein, is presented to address such disadvantages and increase utilization of a storage medium, including a RAID-implemented NAND flash storage medium.

FIG. 3 depicts an illustrative stripe-based technique for writing a sequence of AUs to NAND pages of a RAID-implemented storage medium in accordance with some embodiments. The write technique illustrated in FIG. 3 differs from that illustrated in FIG. 2 because AUs are allowed to break across pages. For example, the second AU breaks across pages 310 and 312, the fourth AU breaks across pages 312 and 314, and the thirteenth AU breaks across pages 316 and 318.

As described above, one issue in the system of FIG. 3, in which a single AU may break cross multiple pages, is the potential for cascading errors that span the pages. To provide some degree of protection against cascading errors, the system of FIG. 3 includes parity check AUs on a per-stripe basis. In particular, all the AUs of row 320 are subject to a parity AU, i.e., the twentieth AU, which breaks across pages 322 and 324. A stripe generally specifies the AUs in the domain of the parity AUs applies. Thus, because a stripe is defined to include all the AUs of the row 320 in FIG. 3, the parity AU 20 is based on the data contained in all the other AUs of the row 320. For example, in some implementations, a byte length of the parity AU is equal to a byte length of a page, each byte of the parity AU is determined by exclusive-ORing some set of bytes spread across the remaining AUs (i.e., AUs 1, 2, 15, 16, 3, 4, 17, 18, 19, 7, and 21) in the row 320. Similarly, all the AUs of row 322 are subject to a parity AU, i.e., the twenty-seventh AU, which breaks across pages 330 and 332.

Compared to writing technique of FIG. 2, the write technique of FIG. 3 has the advantage of more efficiently using the storage media and, in a typical implementation, the additional efficiency gained by allowing bytes to be written across pages will far outweigh the loss of some bytes to serve as parity check bytes. One potential drawback to the implementation depicted in FIG. 3 is that an ability to perfectly recover a lost page (or portion of a page) of data may depend on whether a single additional error (i.e., in addition to the errors due to the lost page or portion of a page) is present anywhere in the stripe.

To illustrate this point, consider a case where a value of a $n^{th}$ byte of the parity check AU of a given stripe (i.e., the twentieth AU for the stripe of row 320 and the twenty-seventh AU for the stripe of row 332) is determined by exclusive ORing the $n^{th}$ position of every AU in the stripe (i.e., not including the parity AU itself). For example, a value of a first byte of the parity check AU labeled 20 is determined by exclusive ORing the first position the AUs labeled 1, 2, 15, 16, 3, 4, 17, 18, 5, 6, 19, 7, and 21. Suppose next that the page 314 malfunctions so that none of the data of the page 314 is readable. In this case, the contents of the page 314 are fully recoverable if there are no errors in any byte of data read from any other page of the row 320 (after ECC decoding is performed on the byte). If, on the other hand, one or more errors remain in any of AUs labeled 1, 2, 15, 16, 3, 4, 17, 18, 19, 7, and 21 after ECC decoding, then the exclusive ORing will not correctly recover all the bytes of the twentieth AU.

Figure 4:
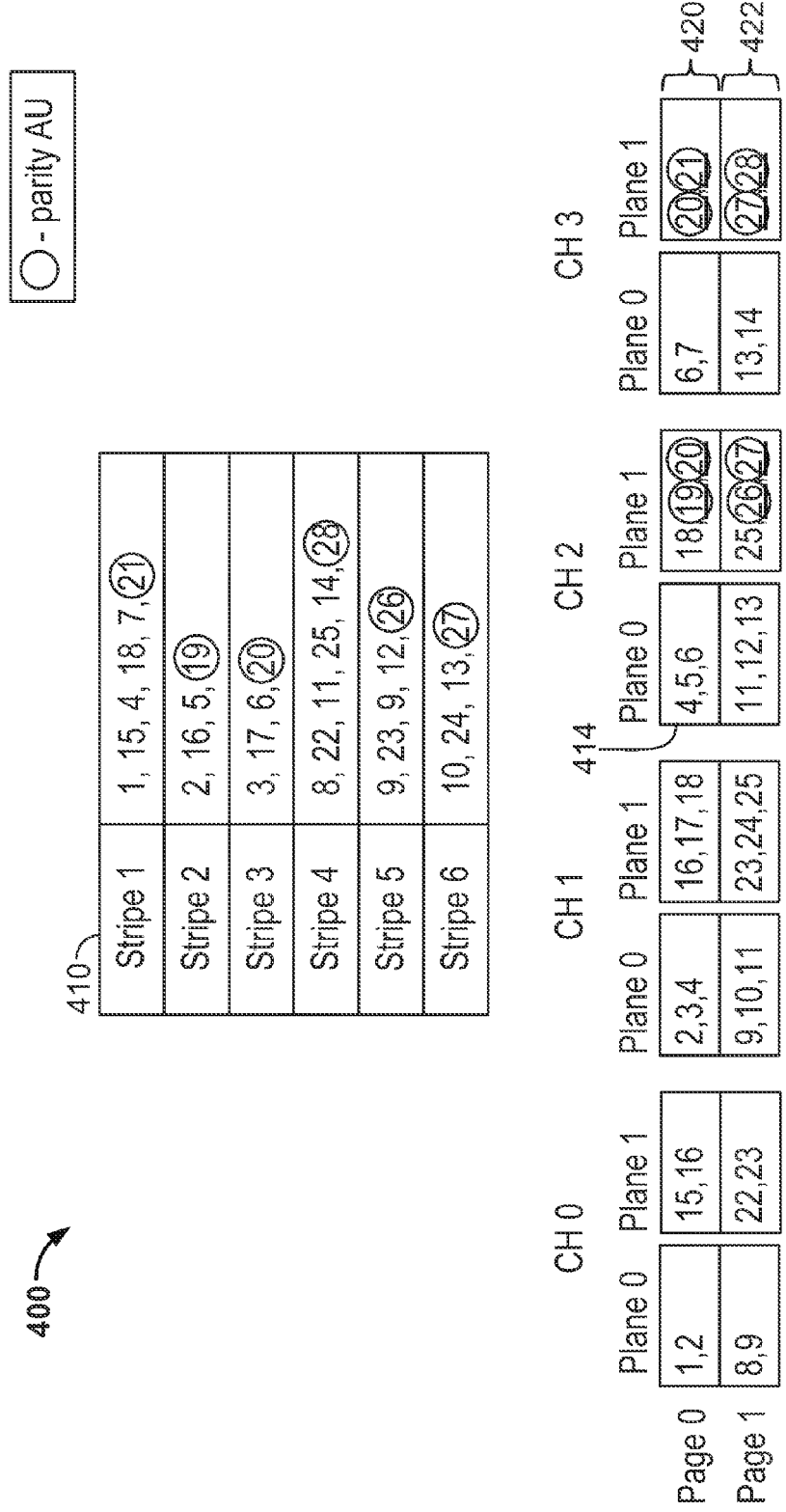
FIG. 4 depicts another illustrative stripe-based technique for writing a sequence of AUs to NAND pages of a RAID-implemented storage medium in accordance with some embodiments.

FIG. 4 depicts another illustrative stripe-based technique for writing a sequence of AUs to NAND pages of a RAID-implemented storage medium in accordance with some embodiments. In the technique of FIG. 4, AUs are allowed to break across pages. However, the write technique illustrated in FIG. 4 differs from that illustrated in FIG. 3 because a stripe is defined as a subset of all AUs within a row of the figure (e.g., row 420) rather than as all the AUs of the row. In the write technique of FIG. 4, AUs take values from 1 through 28 and these values represent an ordered sequence in which these AUs are written to the storage media (with AU 1 written first and AU 28 written last). Specifically, AUs 1 through 7 are written to plane 0 of page 0, AUs 8 through 14 are written to plane 0 of page 1, then AUs 15 through 21 are written to plane 1 of page 0, and AUs 22 through 28 are written to plane 1 of page 1 (all AUs are written to the particular pages depicted in FIG. 3).

As depicted in table 410, stripes 1, 2, and 3 each include a subset of AUs present in the row 420, and stripes 4, 5, and 6 each include a subset AUs present in the row 422. For example, stripe 1 includes six of fourteen total AUs of the row 420 (i.e., AUs labeled 1, 15, 4, 18, 7, and 21), stripe 2 includes four of the fourteen total AUs of the row 420 (i.e., AUs labeled 2, 16, 5, 19), and the stripe 3 includes four of the fourteen total AUs of the row 420 (i.e., AUs labeled 3, 17, 6, and 20). The AUs labeled 19, 20, 21, 26, 27, and 28 are parity AUs and are circled in FIG. 4. As is evident from the table 410, each of stripes 1 through 6 includes exactly one parity AU.

Consider a case where a value of a $n^{th}$ byte of each parity AU of FIG. 4 is determined by exclusive ORing the $n^{th}$ position of each non-parity AU belonging to the stripe containing that AU. For example, a value of a first byte of the parity check AU labeled 21 is determined by exclusive ORing the first position the AUs labeled 1, 15, 4, 18, and 7. In this case, the write technique of FIG. 4 may advantageously be more robust to failure of a page than the write technique of FIG. 3. In particular, suppose that the data of page 414 becomes unreadable. With reference to the listing of the contents of stripe 1 of the table 410, the contents of the AU labeled 4 are fully recoverable if there are no errors in any byte of data read from any of AUs 1, 15, 18, and 7 (after ECC decoding is performed on the byte). Similarly, with reference to the listing of the contents of stripe 2 of the table 410, the contents of the AU labeled 5 are fully recoverable if there are no errors in any byte of data read from any of AUs 2 and 16 (after ECC decoding is performed on the byte). Finally, with reference to the listing of the contents of stripe 3 of the table 410, the contents of the AU labeled 6 are fully recoverable if there are no errors in any byte of data read from any of AUs 3 and 17 (after ECC decoding is performed on the byte).

Thus, when a page becomes unreadable, data can nevertheless be recovered if there are no errors in the decoded values of two other AUs (in the case of stripes 2 and 3) or four other AUs (in the case of stripe 1). Thus, in comparison to the technique of FIG. 3, the technique of FIG. 4 is able to recover any given stripe of data conditional upon a relative small number of AUs remaining errors (i.e., two or four AUs in the case of stripe 1). Thus, on average, the write technique of FIG. 4 is able to read more data correctly in the presence of page failures than the system of FIG. 3. However, the write technique of FIG. 4 requires that a larger fraction of bytes be dedicated to parity than the write technique of FIG. 3. In particular, FIG. 3 requires a total of four parity AUs across all 16 pages while FIG. 4 requires a larger total of eight parity AUs across all 16 pages.

Figure 5:
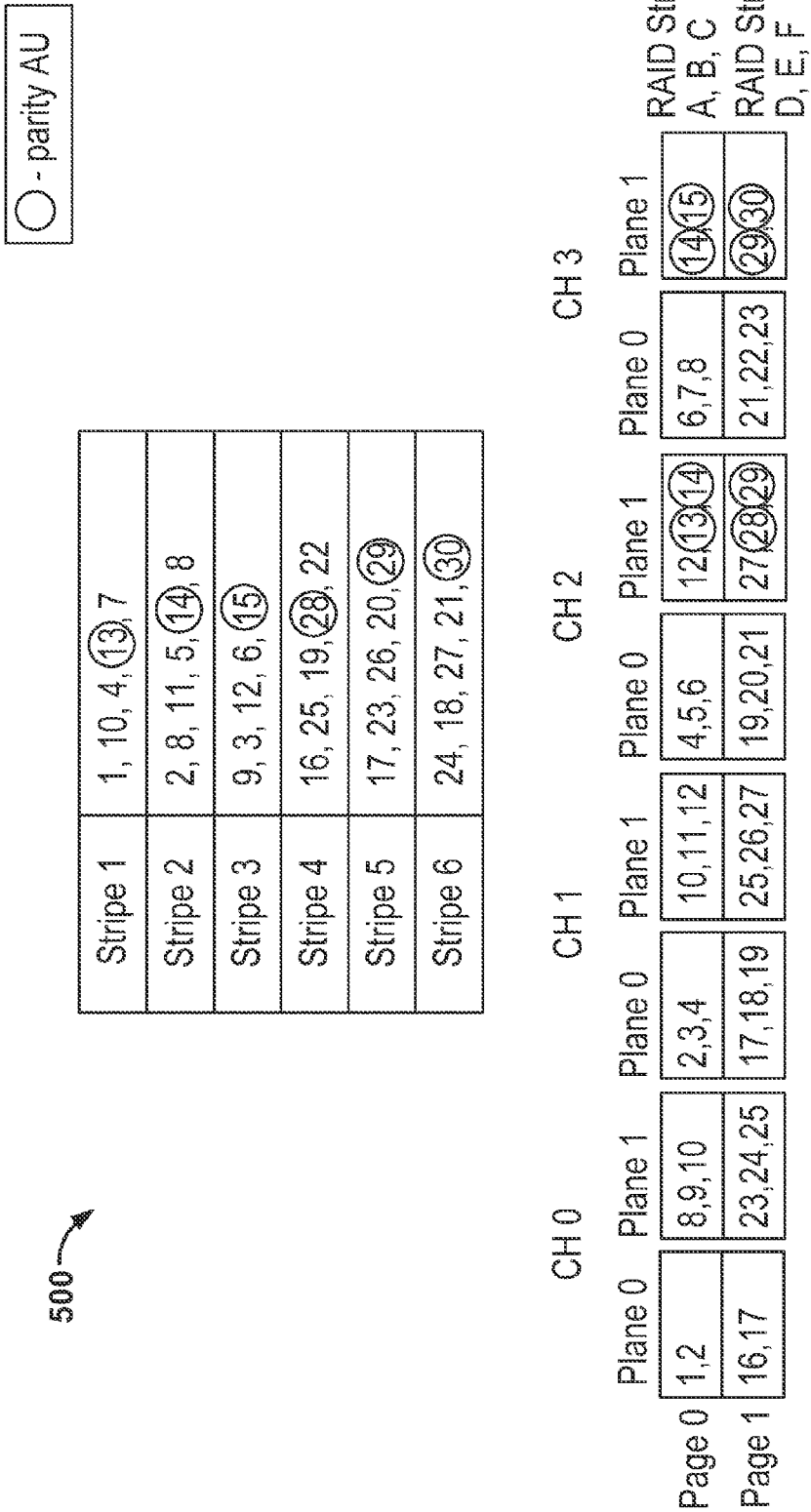
FIG. 5 depicts yet another illustrative stripe-based technique for writing a sequence of AUs to NAND pages of a RAID-implemented storage medium in accordance with some embodiments.

FIG. 5 depicts yet another illustrative stripe-based technique for writing a sequence of AUs to NAND pages of a RAID-implemented storage medium in accordance with some embodiments. The write technique of FIG. 5 is similar to the write technique of FIG. 4, but writes AUs to media in a different order than that of FIG. 3. More particularly, in the write technique of FIG. 4, AUs take values from 1 through 30 and these values represent an ordered sequence in which AUs are written to the storage media (with AU 1 written first and AU 30 written last). Specifically, AUs 1 through (a portion of) 8 are written to plane 0 of page 0, AUs 8 (the remaining portion of AU 8) through 15 are written to plane 1 of page 0, then AUs 16 through (a portion of) 23 are written to plane 0 of page 1, and AUs 23 (the remaining portion of AU 23) through 30 are written to plane 1 of page 1 (all AUs are written to the particular pages depicted in FIG. 4). Thus, the write technique of FIG. 5 writes AUs across planes before writing across pages, whereas the write technique of FIG. 4 writes AUs across pages before writing across planes. The write techniques of FIGS. 4 and 5, however, both use the same amount of overhead parity bytes.

FIG. 6 depicts an additional illustrative stripe-based technique for writing a sequence of AUs to NAND pages of a RAID-implemented storage medium in accordance with some embodiments. The write technique of FIG. 6 is similar to the write techniques of FIGS. 4 and 5, but includes stripes whose AUs span across certain pages. In particular, table 610 lists the four stripes used by the write technique of FIG. 6. As reflected in the table, stripes 2 and 4 each span pages 0 and 1. For example, stripe 2 includes all of portions of AUs labeled 2, 18, 6, 22, 10, 26, 14, and 30 on page 0 and all or portions of AUs 2, 18, 6, 22, 10, 26, 14, and 30 on page 1. In comparison to the write techniques of FIGS. 4 and 5, the write technique of FIG. 6 is able to utilize longer stripes (and a smaller total number of stripes) because it uses stripes that span pages. Further, because the write technique of FIG. 6 uses fewer stripes than the write technique of FIG. 4 or 5, the write technique of FIG. 6 requires less parity overhead than the write technique of either FIG. 4 or 5.

Figure 7:
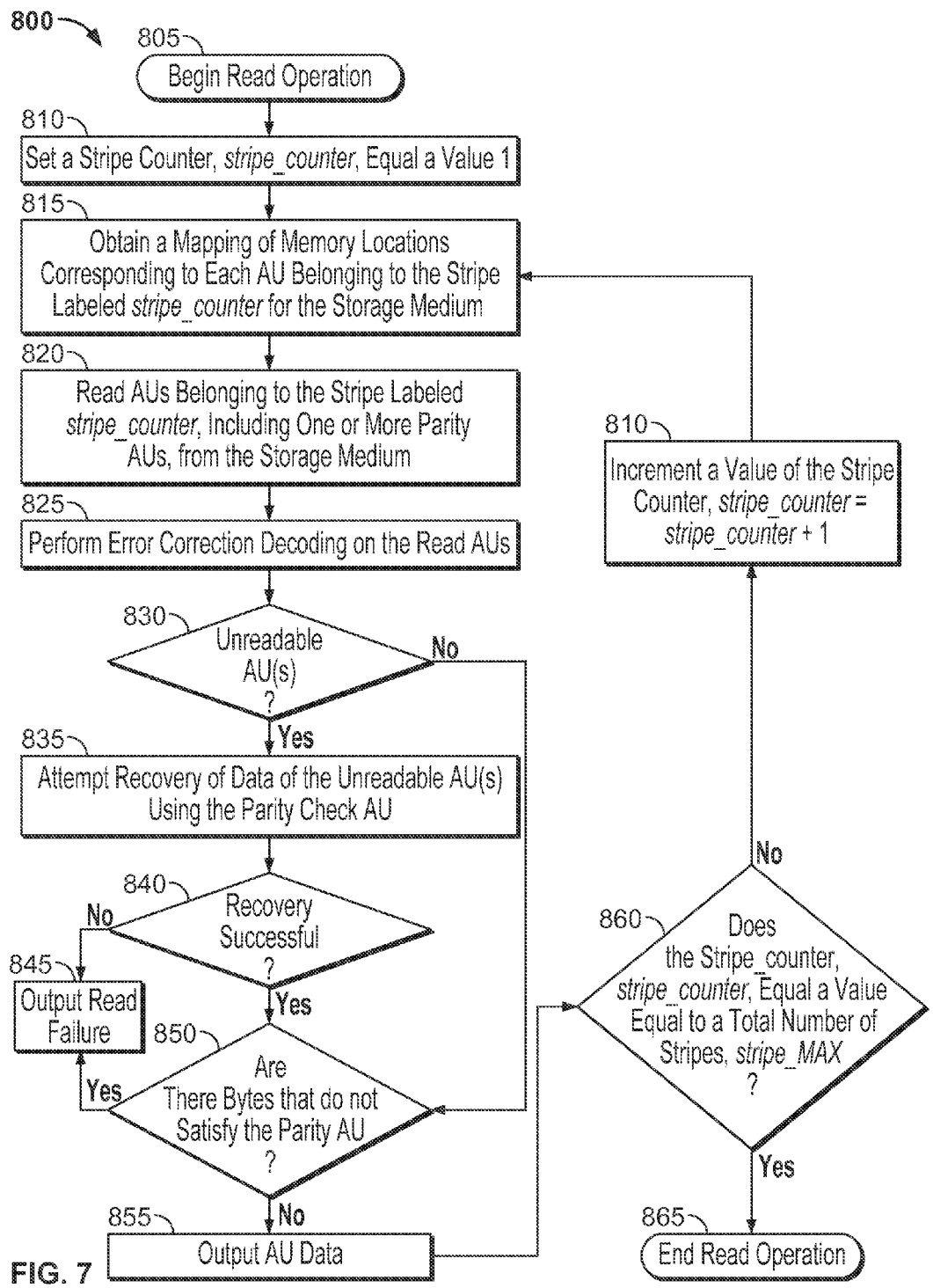
FIG. 7 depicts an illustrative process for reading data from one or more stripes of a storage medium in accordance with some embodiments.

FIG. 7 depicts an illustrative process for reading data from one or more stripes of a storage medium in accordance with some embodiments. The operations described in process 800 may be carried out by firmware installed on a computer system and controlling an SSD controller. The process 800 beings a read operation for one or more stripes of data stored on a storage medium at 805. At 810, a stripe counter, referred to as stripe_counter, is set equal to a value of 1. At 815, a mapping of memory locations corresponding to each AU belonging to the stripe labeled stripe_counter is obtained for the storage medium. For example, the mapping may be obtained from data of a lookup table.

At 820, AUs belonging to the stripe labeled stripe_counter are read from the storage medium based on the memory locations obtained at 815. The read AUs include a AU containing parity information for all other AUs belonging to the stripe labeled stripe_counter. For example, in some implementations, the $n^{th}$ position of the parity AU belonging to a given stripe is determined by exclusive ORing the $n^{th}$ position of every AU in the stripe (other than the parity AU itself). At 825, error correction decoding is performed on the read AUs. In particular, each AU in a stripe is ECC encoded prior to be written to the storage medium and so ECC decoding is performed on a per-AU basis at 825.

At 830, it is determined if there are any unreadable AUs in the AUs read at 820. One or more unreadable AUs may be present if, for example, a given page of the storage medium malfunctions or the data stored on the page becomes otherwise unreadable. If it is determined at 830 that there is at least one unreadable AU, then the process 800 proceeds to 835. On the other hand, if it is determined at 830 that there are no unreadable AUs, then the process 800 proceeds to 850.

At 835, recovery of data of the unreadable AUs is attempted using the parity check AU. In some implementations, the recovery will be successful if there is exactly one unreadable AU in the read AUs and, after the error correction decoding performed at 825, there are no byte errors in any of the readable AUs of the stripe. At 840, it is determined if the recovery of all of the unreadable AUs is successful. If so, the process 800 proceeds to 850. On the other hand, if the recovery is determined not to be successful at 840, then the process 800 proceeds to 845 where a decoding read failure is declared and the process 800 terminates.

At 850, it is determined if there are any bytes in the read AUs (after error correction decoding performed at 825 and any recovery of the non-parity AUs attempted at 835) that do not satisfy the read parity AU. If there is at least one byte that does not satisfy the parity AU, then the process 800 proceeds to 845, where a decoding read failure is declared and the process 800 terminates. On the other hand, if all read AU bytes satisfy the parity AU, then the process 800 proceeds to 855, where the current AU data corresponding to the read AUs is output (i.e. after error correction decoding performed at 825 and any recovery of the non-parity AUs attempted at 835), and the process 800 proceeds to 860.

At 860, it is determined if a current value of the stripe counter, stripe_counter, is equal to a total number of stripes specified for the read operation (e.g., at 805), stripe_MAX. If so, then the process 800 proceeds to 865, where process 800 is terminated. On the other hand, if the current value of the stripe counter, stripe_counter, is not equal to the total number of stripes specified for the read operation, stripe_MAX, then the process 800 proceeds to 870. At 870, the current value of the stripe counter, stripe_counter, is incremented, and the process 800 proceeds returns to 815.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for processing data from a storage medium, the system comprising:
    read circuitry in a controller configured to read a stripe of data stored on the storage medium, the stripe comprising a plurality of encoded data allocation units (AUs) and a parity AU;
    decoding circuitry in the controller configured to apply error correction decoding to each of the plurality of encoded data AUs to produce a plurality of decoded data AUs;
    parity check circuitry in the controller configured to determine when a value of the parity AU is satisfied by values of bytes in the plurality of decoded data AUs; and
    data transfer circuitry in the controller configured to output the plurality of decoded data AUs in response to a determination that the value of the parity AU is satisfied by the values of bytes in the plurality of decoded data AUs.

2. The system of claim 1, comprising data check circuitry in the controller configured to determine when an encoded data AU in the plurality of encoded data AUs is unreadable.

3. The system of claim 1, wherein the read circuitry in the controller comprises a plurality of data transfer channels and wherein the read circuitry in the controller is configured to read a first portion of the stripe of data using a first data transfer channel in the plurality of data transfer channels and a second portion of the stripe of data using a second transfer channel in the plurality of data transfer channels.

4. The system of claim 1, wherein an encoded data AU in the plurality of encoded data AUs is partially stored in each of a first page and a second page of the storage medium.

5. The system of claim 4, wherein the encoded data AU in the plurality of encoded data AUs is partially stored in each of a first data transfer channel and a second data transfer channel of the storage medium.

6. The system of claim 5, wherein the encoded data AU in the plurality of encoded data AUs is partially stored in each of a first plane and a second plane of the storage medium.

7. The system of claim 1, comprising write circuitry in the controller, the write circuitry in the controller configured to write the stripe of data to the storage medium by writing encoded data AUs of the stripe of data across pages and then across planes of the storage medium.

8. The system of claim 1, comprising write circuitry in the controller, the write circuitry in the controller configured to write the stripe of data to the storage medium by writing encoded data AUs of the stripe of data across planes and then across pages of the storage medium.

9. The system of claim 1, comprising encoding circuitry in the controller, the encoding circuitry in the controller configured to generate a value of a byte of the parity AU in a given byte position by exclusive ORing a value of a byte in the given byte position in every decoded data AU in the plurality of decoded data AUs.

10. The system of claim 1, wherein a total number of AUs included in a stripe is fewer than thirty.

11. A method for processing data from a storage medium, the method comprising:
    reading a stripe of data stored on the storage medium, the stripe comprising a plurality of encoded data allocation units (AUs) and a parity AU;
    applying error correction decoding to each of the plurality of encoded data AUs to produce a plurality of decoded data AUs;
    determining when a value of the parity AU is satisfied by values of bytes in the plurality of decoded data AUs; and
    outputting the plurality of decoded data AUs in response to a determination that the value of the parity AU is satisfied by the values of bytes in the plurality of decoded data AUs.

12. The method of claim 11, comprising determining when an encoded data AU in the plurality of encoded data AUs is unreadable.

13. The method of claim 11, comprising reading a first portion of the stripe of data using a first data transfer channel in the plurality of data transfer channels and a second portion of the stripe of data using a second transfer channel in the plurality of data transfer channels.

14. The method of claim 11, comprising partially storing an encoded data AU in the plurality of encoded data AUs in each of a first page and a second page of the storage medium.

15. The method of claim 14, comprising partially storing the encoded data AU in the plurality of encoded data AUs in each of a first data transfer channel and a second data transfer channel of the storage medium.

16. The method of claim 15, comprising partially storing the encoded data AU in the plurality of encoded data AUs in each of a first plane and a second plane of the storage medium.

17. The method of claim 11, comprising writing the stripe of data to the storage medium by writing encoded data AUs of the stripe of data across pages and then across planes of the storage medium.

18. The method of claim 11, comprising writing the stripe of data to the storage medium by writing encoded data AUs of the stripe of data across planes and then across pages of the storage medium.

19. The method of claim 11, comprising generating a value of a byte of the parity AU in a given byte position by exclusive ORing a value of a byte in the given byte position in every decoded data AU in the plurality of decoded data AUs.

20. The method of claim 11, wherein a total number of AUs included in a stripe is fewer than thirty.

\* \* \* \* \*